United States Patent Office 2,933,415
Patented Apr. 19, 1960

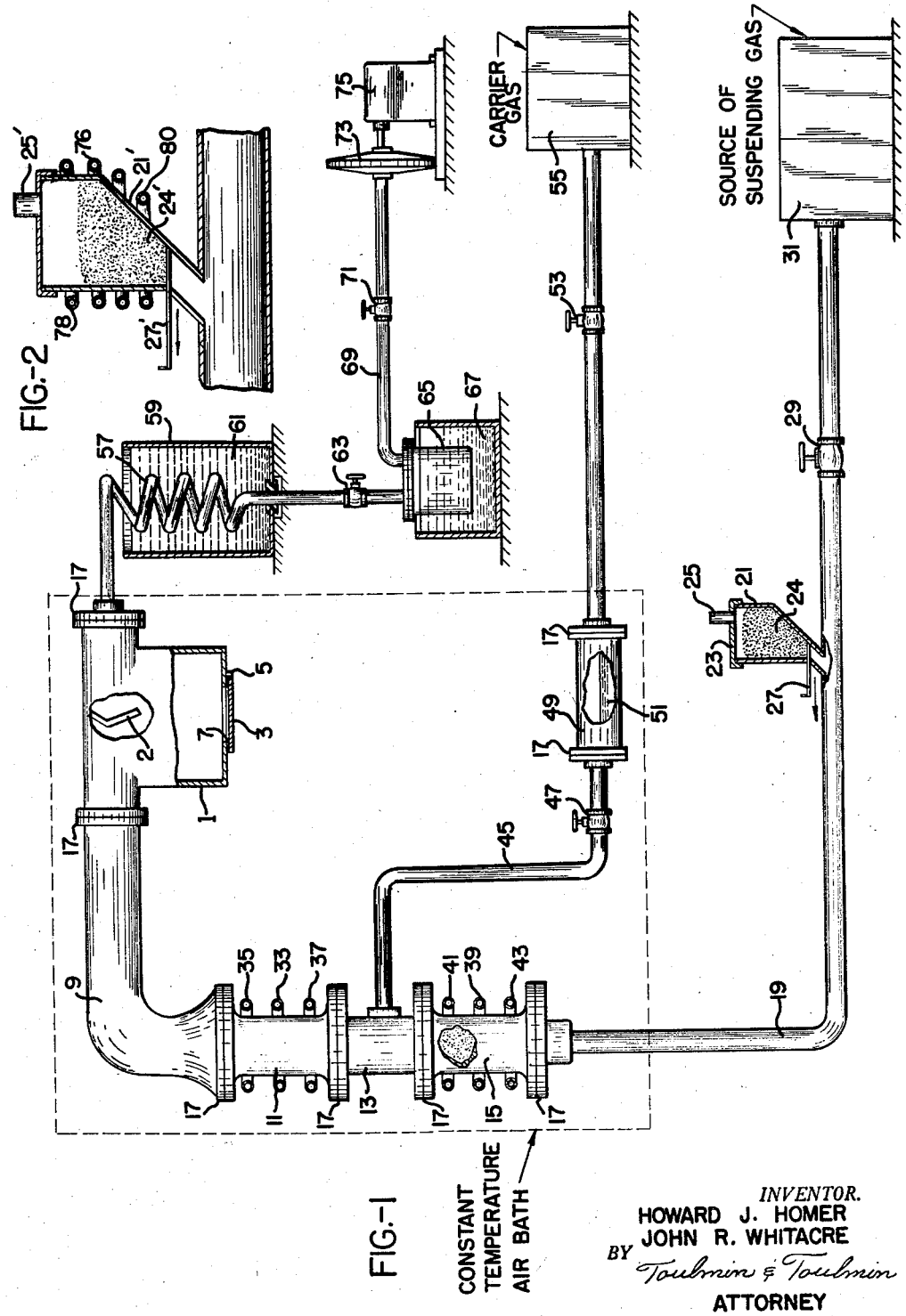

2,933,415

NICKEL COATED IRON PARTICLES

Howard J. Homer and John R. Whitacre, Dayton, Ohio, assignors to The Commonwealth Engineering Company of Ohio, Dayton, Ohio, a corporation of Ohio Application December 23, 1954, Serial No. 477,172

2 Claims. (Cl. 117—100)

This invention relates to the production of metal coatings on metallic particles of extremely small size and to a process and apparatus therefor.

Powdered metals have found increasing use commercially both in the production of metal parts from the compressed compacted powder and as loose materials in apparatus having magnetic and electrical functions. Powdered iron is of particular importance in this latter usage due principally to its magnetic character, but usage in fine loose powdered form is affected by the tendency of the metal to oxidize, the oxidation taking place gradually and non-uniformly, resulting in varying characteristics of the iron electrically and magnetically.

It is a particular object of the present invention to describe a novel process for the coating of metal particles and which process is adapted to provide on the particles a coating which is more resistant to oxidation and to changes in characteristics than is, for example, iron.

It is a particular object of this invention to describe novel apparatus useful in carrying out the process of invention.

It is an important object of the invention to describe novel coated metals having utility in the powdered metal field.

The invention particularly contemplates the suspending of metal particles in a gaseous atmosphere, heating the particles and then contacting the heated particles while in the atmosphere with a gaseous metal bearing compound which is decomposable at the temperature of the particles to deposit metal thereon.

In the specific application of the preferred embodiment of the invention iron particles of about 5–15 microns in diameter, or particles whose longest dimension is not greater than about 15 microns, may be readily supported in a gaseous stream such as a stream of hydrogen and the particles while so supported may be heated inductively.

The hydrogen gas serves the dual function of supporting the small particles and also of deoxidizing the same, and of inhibiting any tendency of the iron towards oxidation. The particles while thus suspended and heated are contacted with a heat decomposable gas such as nickel carbonyl, which breaks down to nickel metal and carbon monoxide, the nickel component being deposited on the heated particle while the carbon monoxide mixes with other gases and is exhausted from the system. Thereafter the metal coated iron particles are separated from the gases, which may include carbon monoxide, hydrogen and undecomposed carbonyl; most suitably the carbonyl is trapped out and the carbon monoxide may be recovered if desired.

In place of hydrogen gas as the suspending medium carbon dioxide or nitrogen may be employed, but such do not have the beneficial reducing effect of the hydrogen. In place of the nickel carbonyl other compounds such as chromium hexacarbonyl or copper acetylacetonate, for example, may be employed.

The nature of the metal to be deposited determines in general the nature of the metal bearing gas and we have found that for most protective coating purposes nickel carbonyl and chromium hexacarbonyl are eminently suitable, the nickel carbonyl being of particular importance as it is readily available commercially at a reasonable cost.

The process of invention is also applicable to other suspended metals than iron, and particularly nickel or steel particles may be employed; the metal is limited primarily only by the necessity for heating the same in a facile manner while it is suspended in an atmosphere of a fluid.

Most suitably the heating of the powdered metal particles is effected by induction means while the metallic particles are suspended in the supporting gas. If desired, however, the metallic particles may be heated prior to their introduction into the metallizing system, as will more fully appear hereinafter.

Most suitably the metal bearing gas is carried into the plating area by a carrier gas which in the case of nickel is preferably carbon dioxide, although other gases such as nitrogen or hydrogen or the more rare gases such as argon may be employed if desired.

The invention will be more fully understood by reference to the following detailed description and accompanying drawings wherein:

Figure 1 schematically illustrates apparatus useful in carrying out a preferred embodiment of the process of invention; and Figure 2 illustrates a further embodiment of apparatus useful in conjunction with the apparatus of Figure 1.

Referring now to the drawings there is shown in Figure 1 at 1 a chest having a lower door 3 hinged at 5 and provided on the interior thereof with gasket 7 which extends around the door abutting the walls of the chest adjoining the door to permit sealing of the chest in air tight relationship with the atmosphere. Extending laterally from the chest in an upper portion thereof is a conduit 9 which communicates with an upwardly extending duct 11, which itself communicates with ducts 13, 15. Flanged connections 17 secure the conduit and ducts together as indicated and a lower flange connection secures the piping 19 to the lower duct 15. Most suitably the ducts 11, 13 and 15 and the piping also, if desired, are of an insulating material such as glass to inhibit the heating thereof during the process and to minimize metallic deposits thereon.

The piping 19 is communicable with a hopper 21 having a cover 23 provided with a finger valve 25. Communication between the piping 19 and the hopper 21 is effected by removing slide member 27 from the bottom of the hopper in the direction indicated by the arrow.

The hopper 21 normally filled with iron powder, which is an extremely small dimension, that is between about 5–15 microns in its longest dimension, and the powder is sealed from the atmosphere by the cover 23; when desired to admit air to the powder the finger valve 25 may be depressed.

Also connected to piping 19 through a valve 29 is a source 31 of a suspending gas for the iron powder, which gas in the present instance may be considered to be hydrogen.

Referring now again to the ducts 11, 13 and 15, the duct 11 is surrounded by an induction coil 33 supplied from a source of high frequency energy (not shown) through leads 35, 37. The duct 15 is similarly surrounded by a high frequency induction coil 39 having its leads 41, 43 connected to a suitable source of alternating current energy (not shown).

The duct 13 is connected through piping 45 and a valve 47 to a container 49 which in the present instance is provided with a supply of nickel carbonyl indicated at 51. Flange connectors 17 serve to provide for communication for the container 49 through valve 53 with a source of carrier gas indicated at 55 and which gas in the present instance may be considered to be carbon dioxide.

Referring now again to chest 1 the upper right hand end thereof is connected through a flange connection 17 to a condenser coil 57 which is provided in a tank 59 supported in any suitable manner and containing a refrigerating liquid 61, such as Dry Ice and acetone in combination. However, even cold water is satisfactory as the refrigerant in the present instance. The coil 57 is connected through valve 63 to a trap 65 housed in a suitable refrigerant 67 and from the upper end of which there extends piping 69 having a valve 71 through which the piping 69 communicates with a vacuum pump 73 and a motor 75.

Referring now to the process of invention with valves 71, 63 open and valves 47, 53, 29 closed, and with the door 3 closed the motor 75 and pump 73 are first actuated to clear the system of all air. To facilitate this member 27 which closes the bottom of the hopper 21 is open slightly and as air is evacuated from the system it is also drawn from the hopper 21. During this time energy may be supplied to the induction coils 33, 39.

With the system evacuated to a low pressure, for example 0.1 of a millimeter of mercury, valve 29 is opened to permit hydrogen gas to flow freely through the system and to assist in the evacuation of any gases remaining therein. At this time the closure member 27 of hopper 21 is so arranged that no powder will be drawn into the system. When the system has been evacuated the closure member 27 is withdrawn slightly to permit iron powder to flow down into the conduit 19 and to be gathered in by the flowing stream of hydrogen which carries the particles upwardly into the duct 15 which is essentially a pre-heating chamber.

Induction coil 39 heats the iron particles flowing therethrough and the temperature of the particles may be raised to approximately 350–450° F. thereby. Valve 53 and valve 47 are this time opened and carrier gas flows through the container 49 over the liquid nickel carbonyl, entrains some of the same and carries it into the duct 13 where it mixes with the hydrogen gas bearing the iron powder. Some slight amount of decomposition of the nickel carbonyl may take place at this time, but the on-rushing hydrogen carries the particles into the duct 11 before very much of such action has occurred.

The carbonyl flows with the hydrogen into the duct 11 where the induction coil 33 which surrounds the duct 11 is effective to heat the iron particles therein to a temperature of approximately 550° F.

The carbonyl gas contacting the iron particles with which it is now intimately mixed, decomposes and deposits nickel metal on the same. Since the walls of the duct 11 are assumed to be of glass substantially no deposition will occur thereon, and such deposition as may occur will generally be insignificant with respect to the surface area of the wall and the cross sectional area of the channel through the duct.

The length of duct may vary with relation to the pressure of the hydrogen gas urging the iron particles upwardly; in fact the relationship is such as to retain the particles within the duct defining the plating chamber for a sufficient length of time to effect the desired extent of nickel deposit. Generally the nickel deposit is required to be extremely minute, merely sufficient to provide an integral coating over each iron particle.

The hydrogen gas together with the gases of decomposition of the carbonyl, the undecomposed carbonyl and the carbonyl dioxide carrier gas flow to the conduit 9. The pressure is such that the particles are impelled against a baffle 2 supported from the wall of the chest 1 and the particles drop downwardly to the bottom of the chamber from whence they are later removable. The flowing gases, the only condensible one of which is undecomposed nickel carbonyl, then pass through the coil 57 and the carbonyl is liquefied and flows downwardly to the bottom of the trap 65, the hydrogen, carbon monoxide and carbon dioxide passing out through the piping 69 to the exhaust 75 of pump 73. The effect of the expansion of the gases on the velocity is most significant and in some instances where contact with the baffle would be undesirable the expansion alone is sufficient to occasion the particles to settle.

It is to be noted that in the practice of the invention the iron powder flows into the piping 19 under its own weight, substantially all air having been removed from the hopper 21 in the evacuation of the apparatus. Therefore there is little opportunity for contamination of the plated particles.

Further in the preferred mode of operation the particles are suspended by a suspending gas against the force of gravity and accordingly due to the fineness of the particles, the particle motion is itself relatively slow depending upon the volume of flow by the suspending gas as well as the duct sizes.

It is further to be noted that the chest 1 is somewhat larger than the conduit 9 and as the gases bearing the coated particles flow into the chest 1 towards the baffle 2, the volume of flow of the gases reduces slightly due to the expansion. This latter factor may be used to control the impingement of the particles on the baffle 2.

In the preferred practice of the invention the hydrogen is recovered and the carbon monoxide is preferably burned to $CO_2$ and utilized as the carrier gas.

Referring now to Figure 2 the hopper 21' is shown therein to be provided with induction coil 76 having leads 78, 80 which are connectible to a source of high frequency energy. Thus in this instance particles 24' within the hopper 21' may be heated prior to entry into the metallizing system. Such is most suitably accomplished with high frequency energy, although electrical resistance may be provided in the walls of the hopper 21' sufficient to effect the heating of the iron powder 24', the same being sufficiently heat conductive to permit of such operation. In such instance the closure member 27' is preferably of non-metallic material in order to permit the same to be grasped in the hand without danger of burning.

It is to be noted that where the hopper 21' is itself heated the valve 25' will permit of the exhaustion of some air during the heating and will thus relieve the pump 73 to some extent during exhaustion.

To facilitate the opening of the system after complete exhaustion therefrom valves 29 and 47 having been closed after the end of the plating operation, the valve 63 is likewise closed and valve 25 depressed to permit entry of the air into the piping 19 and the ducts and also chest 1. Thereafter opening of the chest door 3 is simplified since atmospheric pressure has been restored to the system.

Preferably the conditions, that is, the pressure of the plating gas, the pressure and velocity of the suspending gas, and the temperature, are so related that only a very thin deposit of nickel is attained on the iron powder. Such deposit is preferably less than ½ a micron and may suitably vary from ¼ to ¾ of a micron. Under such conditions the magnetic and electrical properties of the iron particles will not vary to a material extent for most purposes and the nickel will effectively inhibit oxidation of the iron particles.

It is to be noted that other metals which are responsive to induction heating, such as for example nickel, are most useful in the practice of the invention and that such may be plated with any desired metals to achieve the particularly wanted results. For example, combinations of metallic particles, i.e. iron and nickel in combination, may be coated with copper for instance, and similarly nickel alone may be coated with copper or chromium layers.

Further metals may be pre-heated prior to introduction into the hoppers and the apparatus may be insulated to prevent heat loss in conveyance to the plating chamber— in such instance the induction heating may be ancillary or may be dispensed with.

Heating may also be effected by passing the particles in the gaseous stream through a heated metal tube prior to contact with the plating gas.

With these latter procedures non-metallic materials such as fine sand, for example, may be metallized.

The ducts should preferably be of a material which is unaffected by the induction heating when the latter is employed. In general induction heating is preferable as it materially simplifies the control of the procedure.

It will be understood that this invention is susceptible to modification in order to adopt it to different usages and conditions and accordingly, it is desired to comprehend such modifications within this invention as may fall within the scope of the appended claims.

We claim:

1. A mass of loose, metallized iron metal particles, each particle of which comprises a very thin metal coating of nickel gas plated thereon in substantially uniform thickness over the surface of the iron particle, said metal coating being insufficient in thickness to materially change the normal physical characteristics of said iron particles.

2. A mass of loose metallized particles as in claim 1, and wherein the particles are composed of metallic iron, and which particles of iron are of a size between 5 and 15 microns in diameter.

References Cited in the file of this patent

UNITED STATES PATENTS

| | | |
|---|---|---|
| 2,273,704 | Grisdale | Feb. 17, 1942 |
| 2,398,517 | Castor | Apr. 16, 1946 |
| 2,516,058 | Lander | July 18, 1950 |
| 2,612,440 | Altmann | Sept. 30, 1952 |
| 2,616,165 | Brennan | Nov. 4, 1952 |
| 2,638,423 | Davis | May 12, 1953 |
| 2,646,456 | Jacquier | July 21, 1953 |
| 2,649,754 | Davis et al. | Aug. 25, 1953 |
| 2,657,127 | Sindeband et al. | Oct. 27, 1953 |
| 2,657,129 | Stern et al. | Oct. 27, 1953 |
| 2,675,147 | Odom | Apr. 13, 1954 |
| 2,685,124 | Toulmin | Aug. 3, 1954 |
| 2,839,423 | Gemmer | June 17, 1958 |

OTHER REFERENCES

Cline (Journal of the Electrochemical Society), October 1951 (pages 385 to 387 relied on).